United States Patent
Stark et al.

(10) Patent No.: US 8,047,046 B2
(45) Date of Patent: Nov. 1, 2011

(54) SYSTEMS AND METHOD FOR MONITORING UREA LEVEL

(75) Inventors: Cheryl J Stark, Canton, MI (US); James M Dixon, Commerce Township, MI (US); Scott R Gordon, Ann Arbor, MI (US); Michael Christopher Luckham, Highland, MI (US)

(73) Assignee: GM Global Technology Operations LLC

( * ) Notice: Subject to any disclaimer, the term of this patent is extended or adjusted under 35 U.S.C. 154(b) by 386 days.

(21) Appl. No.: 12/366,130

(22) Filed: Feb. 5, 2009

(65) Prior Publication Data

US 2009/0199616 A1  Aug. 13, 2009

Related U.S. Application Data

(60) Provisional application No. 61/027,250, filed on Feb. 8, 2008.

(51) Int. Cl.
*G01F 19/00*  (2006.01)

(52) U.S. Cl. .......................................... 73/1.73; 73/307
(58) Field of Classification Search ................... 73/1.73
See application file for complete search history.

(56) References Cited

U.S. PATENT DOCUMENTS

| | | | |
|---|---|---|---|
| 6,575,010 B2 * | 6/2003 | Colman et al. | 73/1.73 |
| 6,637,196 B1 * | 10/2003 | Tost | 60/286 |
| 2006/0086080 A1 * | 4/2006 | Katogi et al. | 60/278 |

FOREIGN PATENT DOCUMENTS

CN    2101178 U    4/1992

* cited by examiner

*Primary Examiner* — Hezron E Williams
*Assistant Examiner* — Gregory J Redmann (57) ABSTRACT

A sensor diagnostic system comprises first, second, and third dosing agent sensors and a control module. The first, second, and third dosing agent sensors indicate whether a dosing agent is present at first, second, and third volumetric levels of a dosing agent tank, respectively. The second volumetric level is greater than the first volumetric level and the third volumetric level is greater than the second volumetric level. The control module selectively diagnoses a sensor fault in at least one of the first, second, and third dosing agent sensors based on the indications of the first, second, and third dosing agent sensors.

14 Claims, 6 Drawing Sheets

SYSTEMS AND METHOD FOR MONITORING UREA LEVEL

CROSS-REFERENCE TO RELATED APPLICATIONS

This application claims the benefit of U.S. Provisional Application No. 61/027,250, filed on Feb. 8, 2008. The disclosure of the above application is incorporated herein by reference in its entirety.

FIELD

The present disclosure relates to systems and method for monitoring urea levels.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

To meet nitrogen oxide (NOx) emission requirements for a vehicle with a diesel engine, urea may be injected into an exhaust stream. The urea is stored in a tank that may be similar to a conventional fuel tank. Since the emissions impact of running out of urea is severe, correct urea level indication is required to inform the driver. For example, the vehicle may be required to operate in a limp home mode when the urea runs out.

Several unique characteristics of urea delivery systems make urea level sensing systems and on board diagnostic (OBD) monitoring different than fuel level monitoring systems. For example, urea freezes at low temperatures. In addition, the volume of urea consumed per mile may be as low as 5 gallons for 4000 miles. Level sensing systems may be required to independently verify range readings from the sensor.

SUMMARY

A sensor diagnostic system comprises first, second, and third dosing agent sensors and a control module. The first, second, and third dosing agent sensors indicate whether a dosing agent is present at first, second, and third volumetric levels of a dosing agent tank, respectively. The second volumetric level is greater than the first volumetric level and the third volumetric level is greater than the second volumetric level. The control module selectively diagnoses a sensor fault in at least one of the first, second, and third dosing agent sensors based on the indications of the first, second, and third dosing agent sensors.

In other features, the control module diagnoses the sensor fault when the third dosing agent sensor indicates that the dosing agent is present and at least one of the first and second dosing agent sensors indicates that the dosing agent is absent.

In still other features, the control module diagnoses the sensor fault when the second dosing agent sensor indicates that the dosing agent is present and the first dosing agent sensor indicates that the dosing agent is absent.

In further features, the control module diagnoses the sensor fault when the first dosing agent sensor transitions to indicating that the dosing agent is absent while the second dosing agent sensor indicates that the dosing agent is present.

In still further features, the control module diagnoses the sensor fault when the second dosing agent sensor transitions to indicating that the dosing agent is absent while the third dosing agent sensor indicates that the dosing agent is present.

In other features, the control module diagnoses the sensor fault when the first dosing agent sensor transitions to indicating that the dosing agent is absent while a pump pressure is greater than a predetermined pressure.

In still other features, the control module diagnoses the sensor fault when a quantity of the dosing agent injected into an exhaust stream between a first time and a second time is less than a predetermined quantity. The first time corresponds to when the third dosing agent sensor transitions to indicating that the dosing agent is absent while the second dosing agent sensor indicates that the dosing agent is present. The second time is after the first time when the second dosing agent sensor transitions to indicating that the dosing agent is absent.

In further features, the control module diagnoses the sensor fault when a quantity of the dosing agent injected into an exhaust stream between a first time and a second time is less than a predetermined quantity. The first time corresponds to when the second dosing agent sensor transitions to indicating that the dosing agent is absent while the first dosing agent sensor indicates that the dosing agent is present. The second time is after the first time when the first dosing agent sensor transitions to indicating that the dosing agent is absent.

A method comprises indicating whether a dosing agent is present at first, second, and third volumetric levels of a dosing agent tank using first, second, and third dosing agent sensors, respectively, and selectively diagnosing a sensor fault in at least one of the first, second, and third dosing agent sensors based on the indications. The second volumetric level is greater than the first volumetric level, and the third volumetric level is greater than the second volumetric level.

In other features, the selectively diagnosing comprises diagnosing the sensor fault when the indicating comprises indicating that the dosing agent is present at the third volumetric level and that the dosing agent is absent at at least one of the first and second volumetric levels.

In still other features, the selectively diagnosing comprises diagnosing the sensor fault when the indicating comprises indicating that the dosing agent is present at the second volumetric level and that the dosing agent is absent at the first volumetric level.

In further features, the selectively diagnosing comprises diagnosing the sensor fault when the indicating transitions to indicating that the dosing agent is absent at the first volumetric level while indicating that the dosing agent is present at the second level.

In still further features, the selectively diagnosing comprises diagnosing the sensor fault when the indicating transitions to indicating that the dosing agent is absent at the second volumetric level while indicating that the dosing agent is present at the third volumetric level.

In other features, the selectively diagnosing comprises diagnosing the sensor fault when the indicating transitions to indicating that the dosing agent is absent at the first volumetric level while a pump pressure is greater than a predetermined pressure.

In still other features, the selectively diagnosing comprises diagnosing the sensor fault when a quantity of the dosing agent injected into an exhaust stream between a first time and a second time is less than a predetermined quantity. The first time corresponds to when the indicating transitions to indicating that the dosing agent is absent at the third volumetric level while indicating that the dosing agent is present at the second volumetric level. The second time is after the first time when the indicating comprises indicating that the dosing agent is absent at the second volumetric level.

In further features, the selectively diagnosing comprises diagnosing the sensor fault when a quantity of the dosing agent injected into an exhaust stream between a first time and a second time is less than a predetermined quantity. The first time corresponds to when the indicating transitions to indicating that the dosing agent is absent at the second volumetric level while indicating that the dosing agent is present at the first volumetric level. The second time is after the first time when the indicating transitions to indicating that the dosing agent is absent at the first volumetric level.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 1:
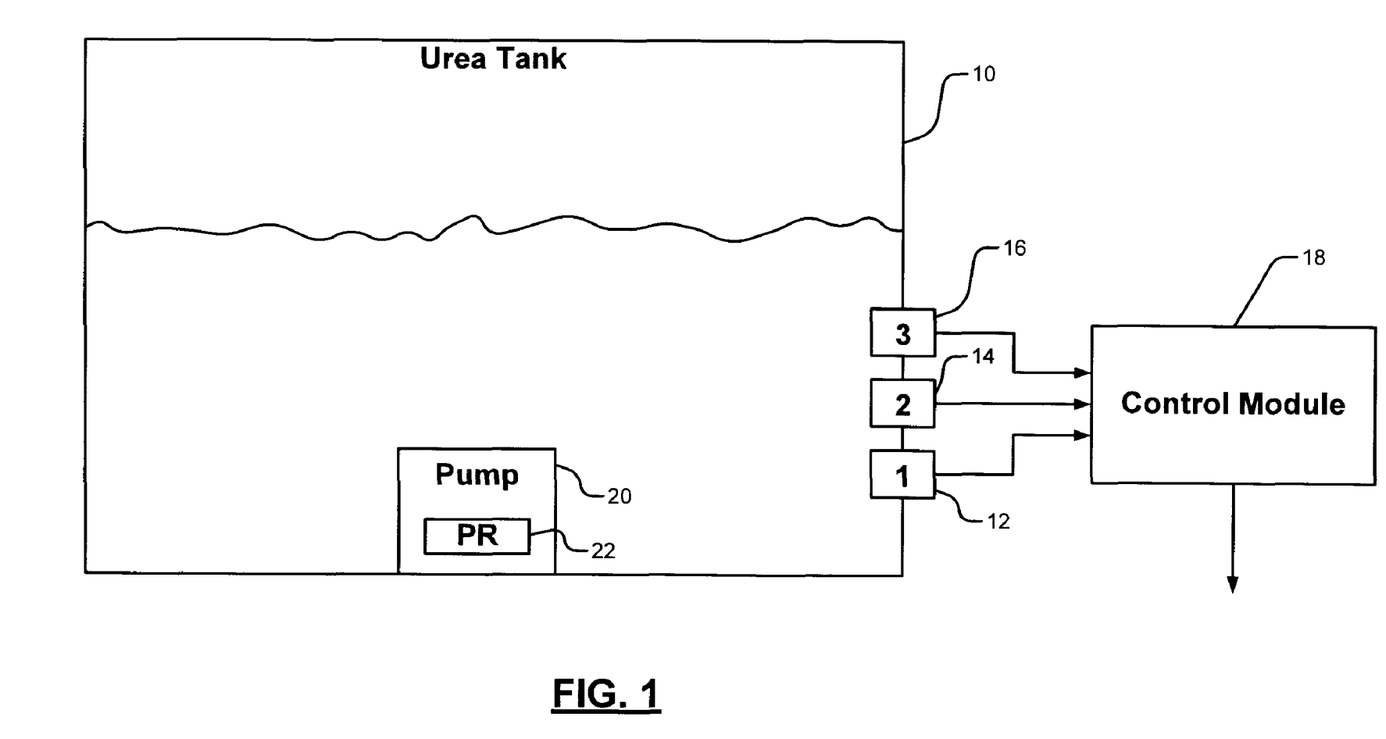
FIG. 1 is a functional block diagram illustrating an exemplary level monitoring system for monitoring urea level in a urea tank.

Referring now to FIG. 1, a urea tank 10 stores urea and includes sensors 12, 14 and 16, which may also be referred to herein as sensor 1 (or S1), sensor 2 (or S2), and sensor 3 (or S3), respectively. The urea tank 10 stores urea that is injected into an exhaust system of a diesel engine (not shown). The sensors 12, 14, and 16 sense the presence or absence of urea adjacent thereto and generate first and second signal states based thereon. While the foregoing description describes sensors with a high state in the presence of urea, a low state may also be used to signify the presence of urea.

The sensor 12 is arranged to sense urea in the urea tank 10 below the sensors 14 and 16. The sensor 14 is arranged to sense urea in the urea tank 10 between the sensor 12 and 16. The sensor 16 is arranged to sense urea in the urea tank 10 above the sensors 12 and 14. A control module 18 receives outputs of the sensors 12, 14, and 16 and performs diagnostics on the sensor outputs to determine sensor faults and verify the sensor outputs. A pump 20 pumps urea and a pressure sensor 22 senses pump pressure. As can be appreciated, the control module 18 may be implemented by an engine control module or other vehicle control module.

Figure 2:
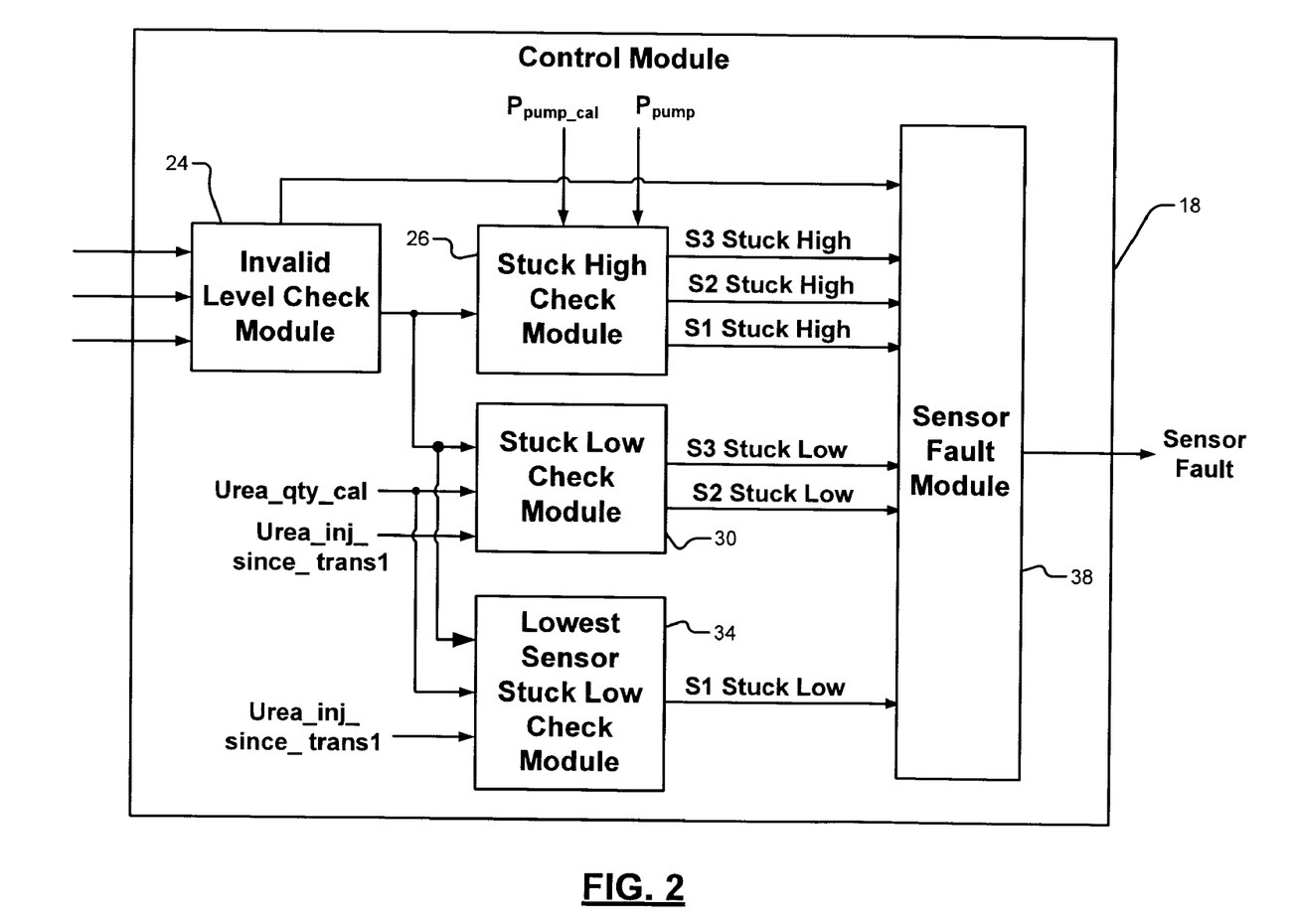
FIG. 2 is a functional block diagram of an exemplary control module of FIG. 1 in further detail.

Referring now to FIG. 2, an exemplary functional block diagram of the control module 18 of FIG. 1 is shown in further detail. The control module 18 may include an invalid level check module 24, a sensor stuck high check module 26, a first stuck low check module 30 and a second stuck low check module 34. A sensor fault module 38 generates a sensor fault based on outputs of the modules 24, 26, 30, and 34, as will be described further below. For example only, the sensor fault module 38 may generate a sensor fault signal, set a flag in diagnostic memory, illuminate a light (e.g., a "check engine" light), and/or generate any other indicator of a sensor fault.

The invalid level check module 24 compares combined sensor states of the sensors 12, 14, and 16 to a table. The table identifies whether the sensor states correspond to a valid combined sensor state for the sensors 12, 14, and 16 or an invalid combined sensor state for the sensors 12, 14, and 16. In addition, the other modules 26, 30, and 34 perform further diagnostics as will be described further below.

The stuck high check module 26 determines whether any of the sensors 12, 14, and 16 are stuck in a high state. The sensor stuck high check module 26 selectively asserts first (or S1), second (or S2), and third (or S3) stuck high signals when the sensors 12, 14, and 16 are in a stuck high state, respectively. The sensor stuck high check module 26 may also receive a pump pressure signal from the urea pump and a pump pressure calibration signal. The stuck high state determination may be based on these values.

The first stuck low check module 30 determines whether the sensors 14 and 16 are in a stuck low state. The first stuck low check module 30 may base the determination on a urea quantity calculation generated by the control module 18 and whether or not urea was injected since a first combined sensor state transition.

The second stuck low check module 34 determines whether the sensor 12 is in a stuck low state. The second stuck low check module 34 may also base the determination on the urea quantity calculation and whether or not urea was injected since a second combined sensor state transition.

Figure 3:
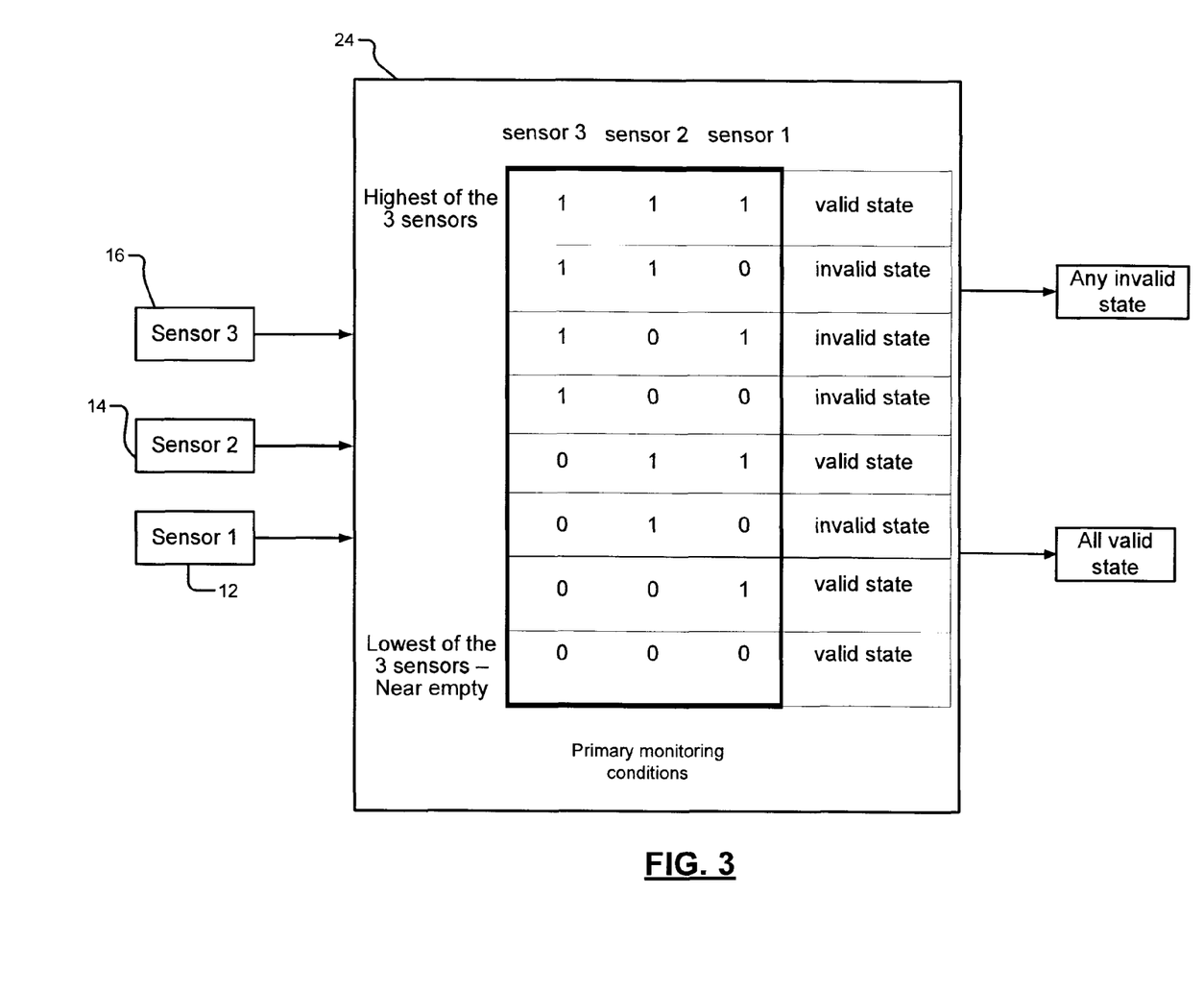
FIG. 3 is a functional block diagram of an exemplary invalid level check module.

Referring now to FIG. 3, an exemplary invalid level check module 24 is shown. Valid combined sensor states may correspond to combined sensor states 111, 011, 001, and 000. Invalid combined sensor states may correspond to combined sensor states 110, 101, 100, and 010. In each of these combined sensor states, the sensor 16 appears first followed by the sensor 14 and then the sensor 12.

Figure 4:
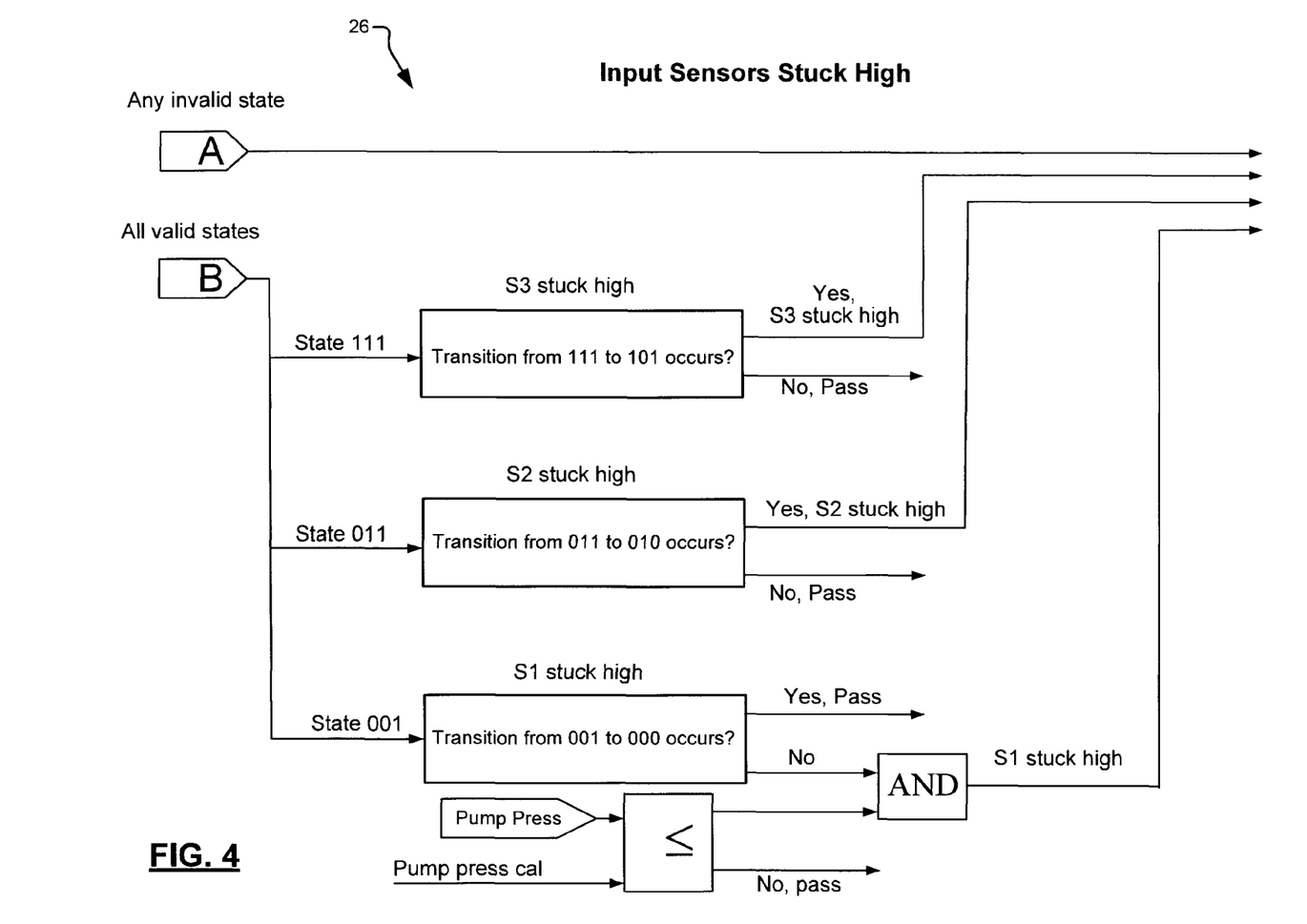
FIG. 4 is a functional block diagram of an exemplary sensor stuck high check module.

Referring now to FIG. 4, an exemplary functional block diagram of the sensor stuck high check module 26 is shown. The sensor stuck high check module 26 determines whether there has been a transition from the combined sensor state of 111 to the combined sensor state of 101. If true, then a stuck high signal is generated for the sensor 16.

The sensor stuck high check module 26 also determines whether a transition has occurred from the combined sensor state of 011 to the combined sensor state of 010. If true, then the sensor stuck high check module 26 generates a stuck high signal for the sensor 14. The sensor stuck high check module 26 also determines whether there has been a transition from the combined sensor state of 001 to the combined sensor state of 000. If false, the sensor stuck high check module 26 compares the pump pressure to the pump pressure calibration. If the pump pressure is less than or equal to the pump pressure calibration and the transition from the combined sensor state of 001 to the combined sensor state of 000 has not occurred, the sensor stuck high check module 26 generates a stuck high signal for the sensor 12.

Figure 5:
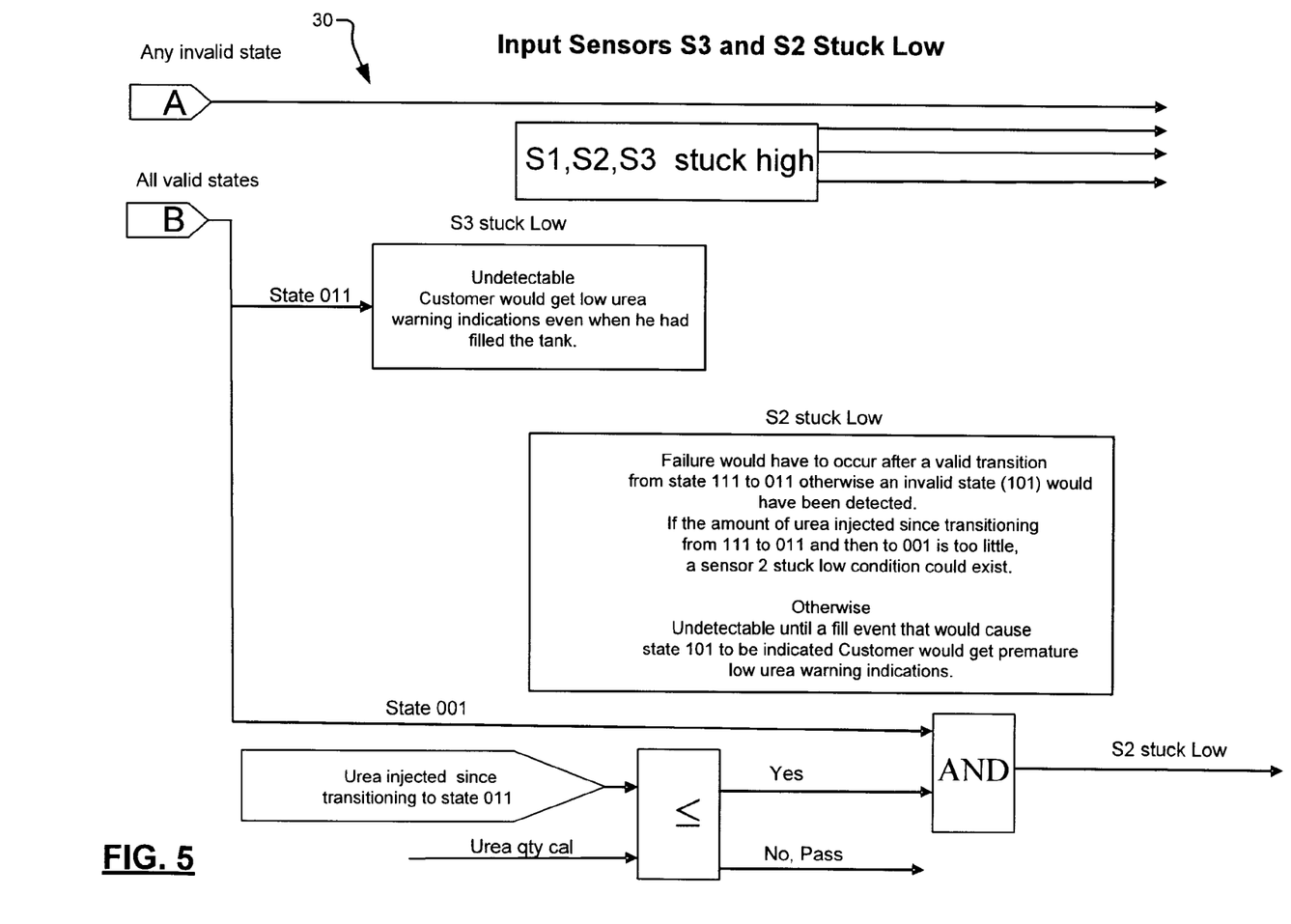
FIG. 5 is a functional block diagram of an exemplary first sensor stuck low check module.

Referring now to FIG. 5, an exemplary first stuck low check module 30 is shown. The first stuck low check module 30 compares urea injected since transitioning to the state of 011 to a urea quantity calibration. If the urea injected is less than or equal to the urea quantity calibration and the current state is equal to the combined sensor state of 001, then a stuck low signal is generated for the sensor 14. A stuck low condition for the sensor 16 is undetectable. However, a customer may receive a low urea warning indication even when the urea tank has been filled.

Figure 6:
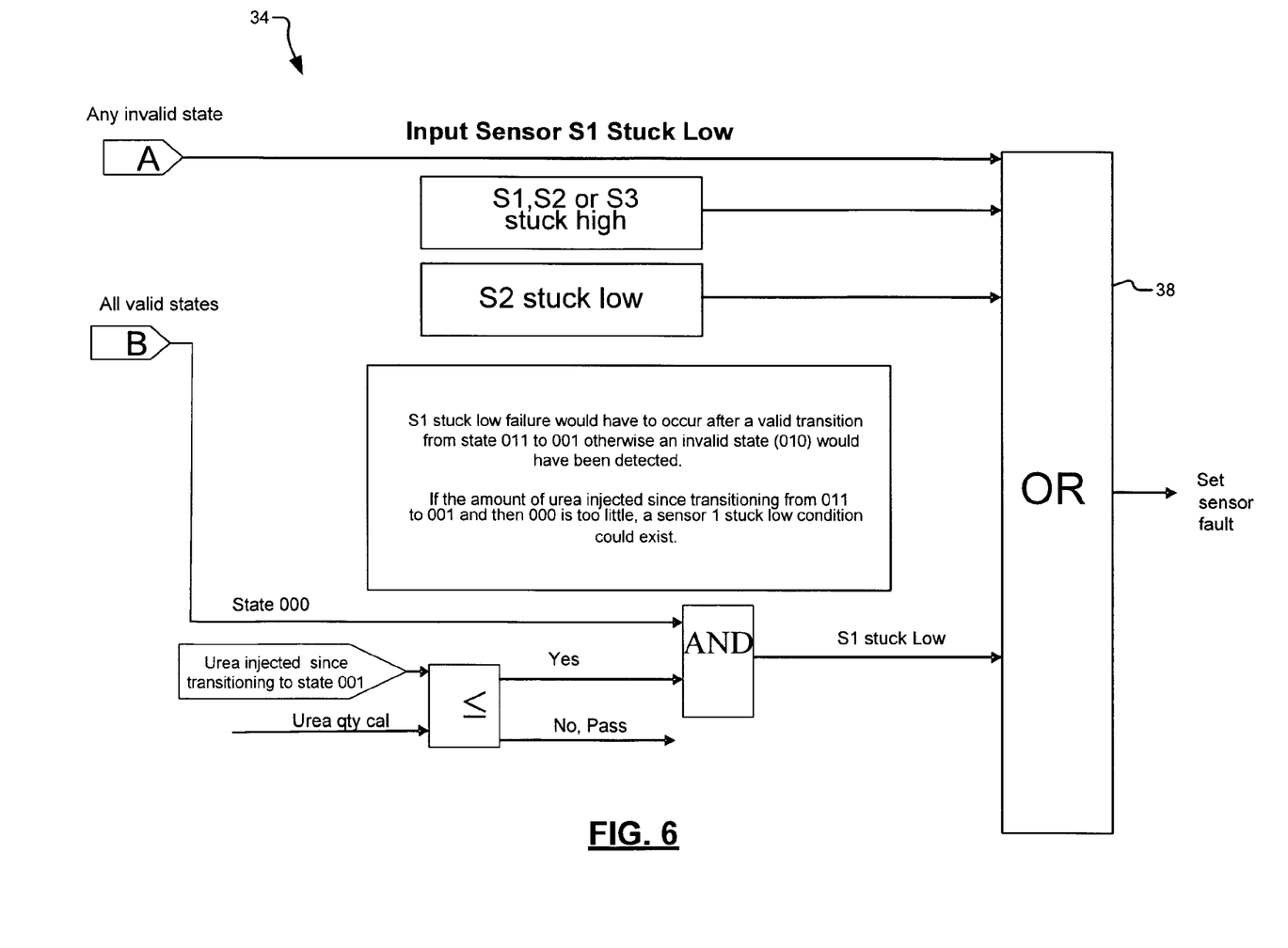
FIG. 6 is a functional block diagram of an exemplary second sensor stuck low check module and a sensor fault output module.

Referring now to FIG. 6, an exemplary functional block diagram of the second stuck low check module 34 and the sensor fault module 38 are shown. The second stuck low check module 34 compares urea injected since transitioning to the combined sensor state of 001 to a urea quantity calibration. If the urea injected is less than or equal to the urea quantity calibration and the current state is equal to the combined sensor state of 000, then a stuck low signal is generated for the sensor 12.

Outputs of the invalid combined sensor states generated by the invalid level check module 24, the stuck high signals, and the stuck low signals are input to the sensor fault module 38. The sensor fault module 38 may include an OR gate, which outputs a sensor fault when any of these signals are asserted.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A sensor diagnostic system comprising:
    first, second, and third dosing agent sensors that indicate whether a dosing agent is present at first, second, and third volumetric levels of a dosing agent tank, respectively, wherein said second volumetric level is greater than said first volumetric level and said third volumetric level is greater than said second volumetric level; and
    a control module that selectively diagnoses a sensor fault in at least one of said first, second, and third dosing agent sensors based on said indications of said first, second, and third dosing agent sensors,
    wherein said control module diagnoses said sensor fault when said first dosing agent sensor transitions to indicating that said dosing agent is absent while a pump pressure is greater than a predetermined pressure.

2. The sensor diagnostic system of claim 1 wherein said control module diagnoses said sensor fault when said third dosing agent sensor indicates that said dosing agent is present and at least one of said first and second dosing agent sensors indicates that said dosing agent is absent.

3. The sensor diagnostic system of claim 1 wherein said control module diagnoses said sensor fault when said second dosing agent sensor indicates that said dosing agent is present and said first dosing agent sensor indicates that said dosing agent is absent.

4. The sensor diagnostic system of claim 1 wherein said control module diagnoses said sensor fault when said first dosing agent sensor transitions to indicating that said dosing agent is absent while said second dosing agent sensor indicates that said dosing agent is present.

5. The sensor diagnostic system of claim 1 wherein said control module diagnoses said sensor fault when said second dosing agent sensor transitions to indicating that said dosing agent is absent while said third dosing agent sensor indicates that said dosing agent is present.

6. The sensor diagnostic system of claim 1 wherein said control module diagnoses said sensor fault when a quantity of said dosing agent injected into an exhaust stream between a first time and a second time is less than a predetermined quantity,
    wherein said first time corresponds to when said third dosing agent sensor transitions to indicating that said dosing agent is absent while said second dosing agent sensor indicates that said dosing agent is present, and
    wherein said second time is after said first time when said second dosing agent sensor transitions to indicating that said dosing agent is absent.

7. The sensor diagnostic system of claim 1 wherein said control module diagnoses said sensor fault when a quantity of said dosing agent injected into an exhaust stream between a first time and a second time is less than a predetermined quantity,
    wherein said first time corresponds to when said second dosing agent sensor transitions to indicating that said dosing agent is absent while said first dosing agent sensor indicates that said dosing agent is present, and
    wherein said second time is after said first time when said first dosing agent sensor transitions to indicating that said dosing agent is absent.

8. A method comprising:
    indicating whether a dosing agent is present at first, second, and third volumetric levels of a dosing agent tank using first, second, and third dosing agent sensors, respectively, wherein said second volumetric level is greater than said first volumetric level and said third volumetric level is greater than said second volumetric level; and
    selectively diagnosing a sensor fault in at least one of said first, second, and third dosing agent sensors based on said indications,
    wherein said selectively diagnosing comprises diagnosing said sensor fault when said indicating transitions to indicating that said dosing agent is absent at said first volumetric level while a pump pressure is greater than a predetermined pressure.

9. The method of claim 8 wherein said selectively diagnosing comprises diagnosing said sensor fault when said indicating comprises indicating that said dosing agent is present at said third volumetric level and that said dosing agent is absent at at least one of said first and second volumetric levels.

10. The method of claim 8 wherein said selectively diagnosing comprises diagnosing said sensor fault when said indicating comprises indicating that said dosing agent is present at said second volumetric level and that said dosing agent is absent at said first volumetric level.

11. The method of claim 8 wherein said selectively diagnosing comprises diagnosing said sensor fault when said indicating transitions to indicating that said dosing agent is absent at said first volumetric level while indicating that said dosing agent is present at said second level.

12. The method of claim 8 wherein said selectively diagnosing comprises diagnosing said sensor fault when said indicating transitions to indicating that said dosing agent is absent at said second volumetric level while indicating that said dosing agent is present at said third volumetric level.

13. The method of claim 8 wherein said selectively diagnosing comprises diagnosing said sensor fault when a quantity of said dosing agent injected into an exhaust stream between a first time and a second time is less than a predetermined quantity,
- wherein said first time corresponds to when said indicating transitions to indicating that said dosing agent is absent at said third volumetric level while said dosing agent is present at said second volumetric level, and
- wherein said second time is after said first time when said indicating comprises indicating that said dosing agent is absent at said second volumetric level.

14. The method of claim 8 wherein said selectively diagnosing comprises diagnosing said sensor fault when a quantity of said dosing agent injected into an exhaust stream between a first time and a second time is less than a predetermined quantity,
- wherein said first time corresponds to when said indicating transitions to indicating that said dosing agent is absent at said second volumetric level while said dosing agent is present at said first volumetric level, and
- wherein said second time is after said first time when said indicating transitions to indicating that said dosing agent is absent at said first volumetric level.

* * * * *